United States Patent
Lintula et al.

(10) Patent No.: US 9,205,450 B2
(45) Date of Patent: Dec. 8, 2015

(54) ROD-BED ASSEMBLY

(71) Applicants: Timo S. Lintula, Jyväskylä (FI); Arto Karusalmi, Korpilahti (FI); Ari-Pekka Kautto, Jyskä (FI); Sami Kuparinen, Jyväskylä (FI)

(72) Inventors: Timo S. Lintula, Jyväskylä (FI); Arto Karusalmi, Korpilahti (FI); Ari-Pekka Kautto, Jyskä (FI); Sami Kuparinen, Jyväskylä (FI)

(73) Assignee: VALMET TECHNOLOGIES, INC., Espoo (FI)

( * ) Notice: Subject to any disclaimer, the term of this patent is extended or adjusted under 35 U.S.C. 154(b) by 127 days.

(21) Appl. No.: 14/036,958

(22) Filed: Sep. 25, 2013

(65) Prior Publication Data

US 2014/0083354 A1    Mar. 27, 2014

(30) Foreign Application Priority Data

Sep. 27, 2012    (EP) .................................... 12186205

(51) Int. Cl.
| B05C 11/00 | (2006.01) |
| F16M 13/02 | (2006.01) |
| B05C 11/02 | (2006.01) |
| D21H 25/12 | (2006.01) |
| B05C 1/08 | (2006.01) |

(52) U.S. Cl.
CPC ............. B05C 11/00 (2013.01); B05C 1/0834 (2013.01); B05C 11/025 (2013.01); D21H 25/12 (2013.01); F16M 13/02 (2013.01)

(58) Field of Classification Search
CPC .... B05C 1/0834; B05C 11/00; B05C 11/025; B05C 3/18; D21H 23/32; D21H 25/12; F16M 13/02

USPC ......... 118/110, 123, 126, 413, 414, 261, 262; 162/261, 281; 248/534; 29/428; 15/256.5, 256.51, 256.52; 427/428.14, 427/359

See application file for complete search history.

(56) References Cited

U.S. PATENT DOCUMENTS 3,701,335 A    10/1972    Barnscheidt

FOREIGN PATENT DOCUMENTS

| DE | 19602483 | * | 6/1997 |
| DE | 10045515 A1 | | 4/2002 |
| DE | 102009061033 A1 | | 12/2010 |
| EP | 1485209 A1 | | 12/2004 |
| EP | 1954880 A1 | | 8/2008 |
| EP | 2341185 A1 | | 7/2011 |
| WO | 9826457 A1 | | 6/1998 |
| WO | WO00/58555 | * | 10/2000 |
| WO | 03078077 A1 | | 9/2003 |
| WO | 2007063183 A1 | | 6/2007 |
| WO | 2010142513 A1 | | 12/2010 |

OTHER PUBLICATIONS

European Search Report for EP12186205 dated Dec. 12, 2012.

* cited by examiner

*Primary Examiner* — Laura Edwards

(74) *Attorney, Agent, or Firm* — Stiennon & Stiennon

(57) ABSTRACT

A rod-bed assembly has a holder (30) with a groove (31) into which an insert (20) is removably and insertably supported. The assembly has a rod (10) which is rotatably supported in a recess (21) on the front side of the insert (20). The material thickness (T) of the cross-section of the insert (20) is between 1-5 mm. The invention also relates to a rod -rod-bed assembly.

15 Claims, 3 Drawing Sheets

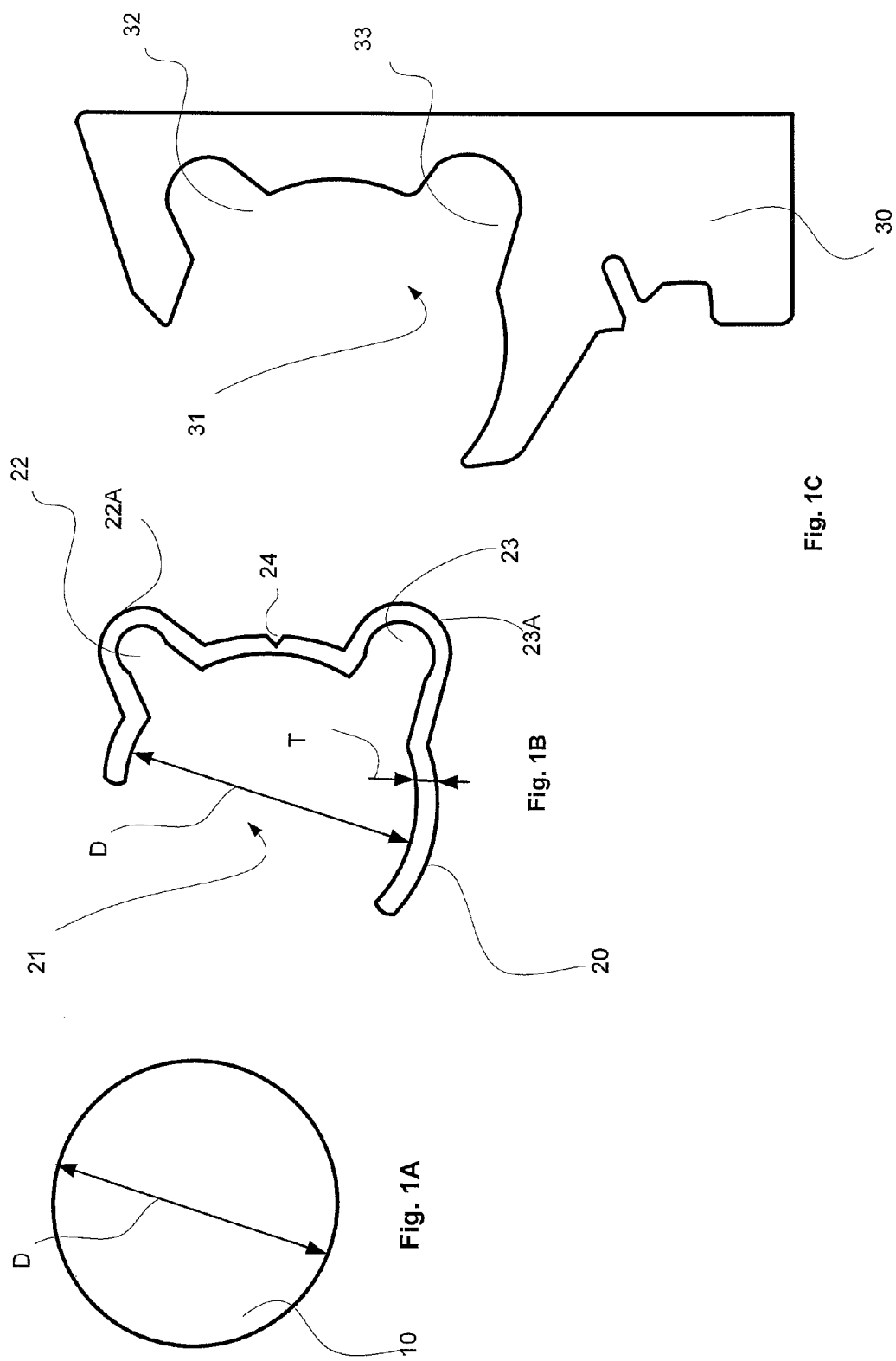

ROD-BED ASSEMBLY

CROSS REFERENCES TO RELATED APPLICATIONS

This application claims priority on European Application No. EP12186205, filed Sep. 27, 2012, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a rod-bed assembly and to be more precise to a rod-bed assembly for a rod of a device for coating or sizing a fiber web, particularly a paper or a board web. The invention also relates to a rod—rod-bed assembly.

In this description and in the claims, by term rod-bed assembly is meant the rod-bed comprising an insert and a holder for a rod of a device for coating or sizing a fiber web. The front side of a rod-bed assembly is the side on which the rod is located in use i.e. the side that will face the fiber web to be coated or the sizing roll onto which the sizing agent is applied by the rod when sized. It should be understood that in the prior art publications relating to rod-bed assemblies there exists differences in the terminology used, for example in relation to the feature whether or not the rod is included in the assembly. In practice the rods and the rod-bed assemblies can be supplied to a device for coating or sizing a fiber web from different suppliers or from the same supplier.

As known from the prior art in fiber web producing processes, the fiber web producing processes typically comprise an assembly formed by a number of apparatuses arranged consecutively in a process line. A typical production and treatment line comprises a head box, a wire section and a press section as well as a subsequent drying section and a reel-up. The production and treatment line can further comprise other devices and sections for finishing the fiber web, for example, a sizer, a calender, or a coating section. The production and treatment line also comprises at least one winder for forming customer rolls as well as a roll packaging apparatus. In this description and the following claims by fiber webs are meant for example paper and board webs.

In production of fiber webs, for example of paper or board webs, sizing is used to alter the properties of a fiber web by adding sizing agents (sizing medium), for example glue chemicals. Sizing can be divided to internal sizing and surface sizing. In internal sizing the sizing agent is added to pulp in the wet end of the fiber web machine before forming. In surface sizing the sizing agent is added onto the surface of the fiber web at the dry end of the fiber web machine.

In production of fiber webs, for example of paper or board webs, a coating, especially of the surface of a fiber web is formed with a layer of coating paste (coating medium) at a coating station followed by drying. The coating process can be divided in supplying the coating paste onto the web surface, which is called the application of the coating paste, as well as in the adjustment of the final amount of coating paste.

The coating or the sizing of a fiber web typically utilizes a coating device—a coater—or a sizing device—a sizer. In connection with the coaters and sizers, different kinds of application technology for application of the coating or the sizing medium on the fiber web are employed in prior art arrangements, for example curtain technology or blade coating technology or rod coating technology or air brush coating technology or spray coating technology.

In the coating or sizing based on rod technology rod-bed assemblies are used for the rod or doctor rod functioning as dosing element of the coating or sizing medium, for scraping off the excessive medium quantity, of the sizing or coating medium. In the sizing the rod functions against a roll and in the coating the rod functions against the fiber web.

DE 100 45 515 A1 shows one example of a known rod-bed assembly which comprises a holder, a doctor bed made of elastic material inserted into the holder for rods with diameter less than 25 mm and in which the cross section surface of the rod-bed is less than three times the cross section of the doctor rod.

EP 1 485 209 A1 shows a further example of a known rod-bed assembly in which a metal doctor rod that has a diameter less than 25 mm is insertable into a rod-bed made of elastomer. The rod-bed insert is inserted into a holding groove of a holder also made of elastomer.

EP 1 954 880 A1 shows yet a further example of a known rod-bed assembly in which the rod cradle (the rod-bed) includes a frame profile (holder) equipped with an insert groove, an insert fitted to this equipped with a rod groove, and a rod and locking elements for locking the insert into the frame profile. This known rod-bed assembly is for rods with a diameter of 9-25 mm.

WO 2010/142513 shows also an example of a known rod-bed assembly comprising a holder made of composite material, a rod-bed made of polymer and a o doctor rod rotatably supported in a bearing recess on the front side of the rod-bed. The holder is formed such that the rod-bed and the doctor rod are insertable into and removable from a socket provided in the holder in the radial direction of the rod and the rod-bed comprises closed cavities for saving material. This known rod-bed assembly mentions as large rods doctor rods having a diameter of 20 to 25 mm and requiring larger rod-beds and holders.

It is a problem of prior art that the rod-bed assemblies are not suitable in cases where rods of diameter over 25 mm are used since space requirements for inserts of rod-bed assemblies that would be suitable for larger rods (i.e. rods with diameter over 25 mm) cannot be realized due to lacking space for locking surfaces, cavities etc. of these known assemblies.

SUMMARY OF THE INVENTION

An object of the present invention is to create a rod-bed assembly especially for larger rods that have a diameter over 25 mm, for example a diameter of 35 mm or 40 mm but which is also suitable for rods with different diameters.

Another object of the present invention is to create a rod-bed assembly with simple and fast replacement for the rod and for the insert/rod-bed from the holder as these are wearing parts that need to be replaced at regular intervals.

Yet another object of the present invention is to provide a rod-bed assembly in which the rod is securely fastened in the rod-bed during use since a case of unfastening of a rod during use in a device for application of sizing or coating agent would cause serious safety risks and also serious difficulties in the production of the fiber web, possibly the whole production line would need to be stopped.

In order to achieve the above objects and to solve the problems of the prior art mentioned above and becoming apparent later, in the rod-bed assembly of the invention the material thickness (T) of the cross-section of an insert positioned between the rod and a rod holder is between 1-5 mm.

According to the invention the rod-bed assembly comprises the holder, the insert removably and insertably supported in a groove of the holder, and in which rod-bed assembly a rod of a coating or sizing device is rotatably supported in a recess on the front side of the insert and in which rod-bed assembly the material thickness of the cross-section of the insert is between 1-5 mm.

Advantageously the insert is of elastic material or of elastic shape.

Advantageously the cross-section of the insert is of substantially even material thickness with the exception of at least one drawdown of decreased thickness for providing elasticity for inserting and removing the insert into and from the holder.

Advantageously the cross-section of the insert is of substantially even material thickness with the exception of an advantageous decreased thickness of the tips of water exit channels for providing a passage for water to exit.

Advantageously the insert and the rod are insertable and removable from the holder in the radial direction of the rod from the front side of the rod-bed assembly.

According to an advantageous feature of the invention the insert is form fitting into the groove of the holder. The fit between the insert and the holder can also be snap-fitting.

According to an advantageous feature of the invention the recess of the insert is provided with a round main inner form for locking the rod into the rod-bed assembly when placed into the insert.

According to an advantageous feature of the invention the holder is composite material or plastic, preferably of polyethene and the insert is composite material or plastic, preferably of polyethene.

According to an advantageous feature of the invention the rod-bed assembly is for rods with a diameter over 25 mm and thus the diameter of the round main inner form of the recess of the insert is over 25 mm corresponding to the diameter of the rod to be inserted. Further the main inner form of the groove of the holder is round and its diameter is correspondingly over 25 mm+the material thickness of the cross-section of the insert.

According to an advantageous feature of the invention water exit channels of the rod-bed assembly are of the same or of a different diameter and the diameter of the water exit channel that is lower when the rod-bed assembly is positioned for use is at least the same as the diameter of the water exit channel that is upper when the rod-bed assembly is positioned for use.

In the rod-bed assembly the holder is advantageously composite material for providing structural strength, mounting of the rod, holding of the rod, preventing the contamination due to advantageously tight formfitting fit with the insert, holding lubrication water in the water channels, low thermal conductivity and due to its rigidity provides for the possibility of light, low-cost and elastic insert. Further advantages of a composite holder are the thermal durability in process temperatures of coating and sizing, for example over 80° C.

In the rod-bed assembly the insert is advantageously of elastic material, preferably plastic material, more advantageously of polyethene providing good friction properties, sufficient thermal properties, and cost-effectiveness due to protecting the holder from wear, easy inserting and removing, and good formfitting.

The insert provides a thin shell-like structure inside the holder, which substantially follows the groove from of the holder as an inside layer with cross-sectional material thickness between 1-5 mm, which thickness is substantially even with possible exceptions of decreased material thickness for water channel areas and for elasticity increasing at least one drawdown. The insert provides a removable protection layer inside the holder of the rod-bed assembly and place for the rod.

BRIEF DESCRIPTION OF THE DRAWINGS

In the following the invention is described in more detail with reference to the accompanying drawings.

FIGS. 1A-1C show schematically one example of rod and rod-bed assembly in a non-assembled state;

DESCRIPTION OF THE PREFERRED EMBODIMENTS

Figure 2A:
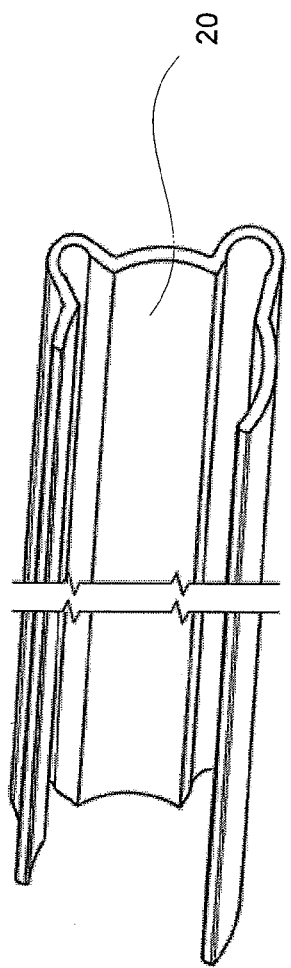
FIGS. 2A shows a schematical three dimensional example of the insert according to the invention.

In the following description relating to the figures, the same reference signs are used for corresponding parts and part components unless otherwise mentioned.

In FIG. 1A is schematically shown a cross section of a rod 10 for dosing of coating medium onto the fiber web during coating of the fiber web in a coater or for dosing of sizing medium onto the sizing roll, by which the sizing medium is applied onto the fiber web, during sizing at a sizer. The rod 10 is advantageously of metal and its diameter D is over 25 mm, for example 35 mm or 40 mm. The rod 10 is in this example smooth surfaced but the rod-bed assembly according to the invention is also suitable for grooved rods. The rod 10 will be placed into a recess 21 of an insert 20, shown in FIG. 1B, located in a holder 30, shown in FIG. 1C for its use, advantageously inserted in the radial direction of the rod 10 from the front side of the insert and the holder.

In FIG. 1B is schematically shown an insert 20 of the rod-bed assembly for is holding the rod 10 in its recess 21 that is of mainly round shape, thus corresponding to the cross sectional round shape of the rod 10 and of the corresponding diameter D over 25 mm with tight tolerance in respect of the diameter of the rod. The cross sectional material thickness T of the insert 20 is substantially even with advantageously the exception of the tip parts 22A, 23A "Mickey Mouse ears" shaped water exit channels 22, 23, in which tip parts 22A, 23A the material thickness is slightly decreased, and with advantageously at least one drawdown 24 with decreased material thickness for providing elasticity for inserting and removing the insert. The material thickness T of the cross-section insert 20 is 1-5 mm and at the tip parts it is 1-4 mm, advantageously 1-3 mm, preferably 1-2 mm. The material of the insert 20 is advantageously polyethene or composite. The water exit channels 22, 23 for lubrication water and for providing space for water tubes can be of different diameters, advantageously in the figure the lower channel is bigger but the water exit channels can also be of the same size. For example, the water exit channel 22 is for providing space for a water tube with a 6 mm diameter and the water exit channel 23 is for providing space for a water tube with an 8 mm diameter.

In FIG. 1C is schematically shown the holder 30 of the rod-bed assembly. The holder 30 has a recess 31 corresponding to the shape of the insert 20 with corresponding formed lug grooves 32, 33 for the "Mickey Mouse ears" shaped water exit channels 22, 23 of the insert 20. The lug grooves 32, 33 for water exit channels 22, 23 of the insert 20 can be of different diameters, advantageously in the figure the lower, i.e. closer to the leg part of the holder 30, positioned lug groove 33 is bigger, but the lug grooves 32, 33 can also be of same size. The size of the recess 31 is corresponding to the space to be taken by the insert 20 with the rod 10 added with the material thickness T so that the insert 20 will accommodate tightly the recess 31 of the holder 30 and to lock the rod 10 when placed. The holder 30 is of composite material or of polyethene. The holder 30 can be attached to the sizer or the coater by manners known as such to one skilled in the art.

Figure 2B:
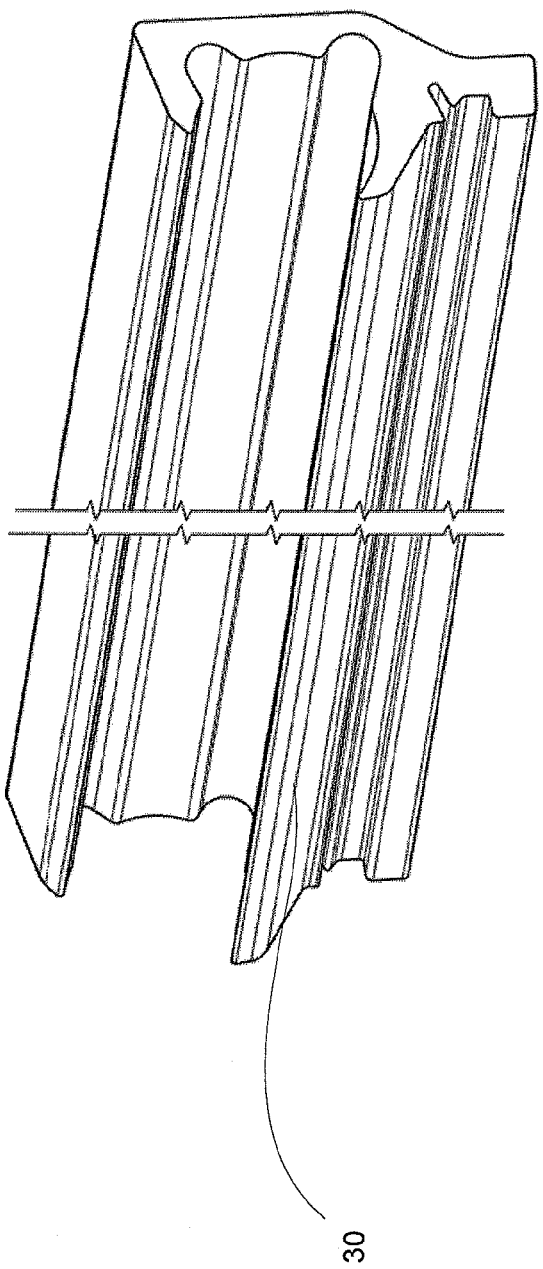
FIG. 2B shows a schematical three dimensional example of the holder according to the invention.

As can be seen from FIGS. 2A-2B, the insert 20 and the holder 30 are elongate profiles the length of which will extend at least over the width of the fiber web to be sized or coated, so that the over the same fiber web width extending rod 10 is able to dose the sizing medium or the coating medium on the width of fiber web.

Figure 3A:
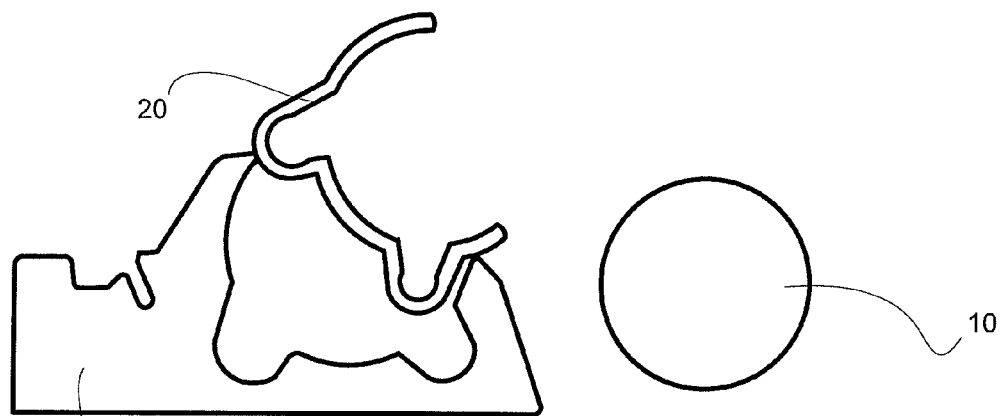
FIGS. 3A-3D show schematically steps of assembling one example of the rod—rod-bed assembly according to the invention.
Figure 3B:
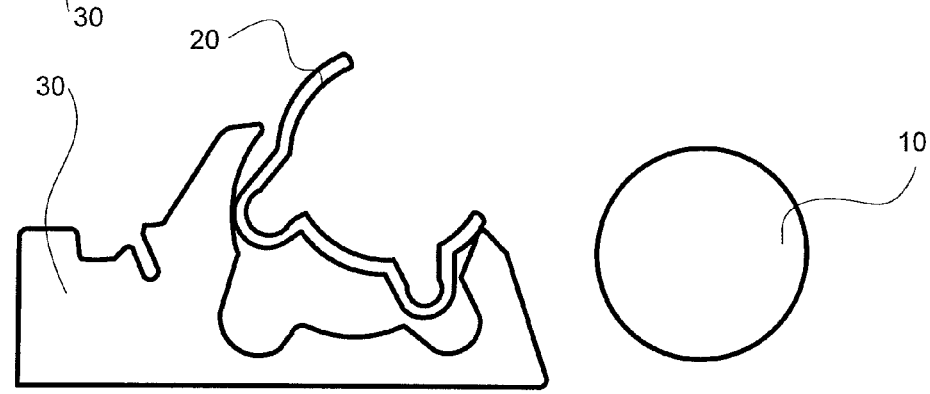
Figure 3C:
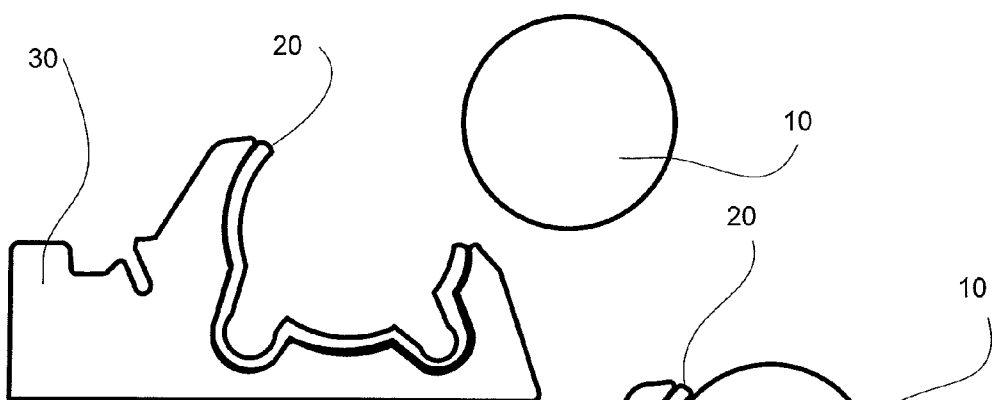
Figure 3D:

In FIGS. 3A-3D are shown schematically steps of assembling one example of the rod-bed assembly. As shown in FIG. 3A, first one side of the insert 20 is inserted into the groove of the holder. The other side of the insert 20 is slightly pressed and simultaneously the insert 20 is further inserted deeper into the groove of the holder 30 as shown in FIG. 3B. Thereafter the insert 20 is inserted to the groove of the holder 30 such that the insert 20 is located form-fittingly in the groove of the holder 30, as shown in FIG. 3C. Finally the rod 10 is pressed in its radial direction into the recess of the insert 20 and the round shape of the rod 10 locks the rod 10 for use, as is apparent from FIG. 3D.

Above the invention has been explained with reference to an advantageous example only to details of which the invention is not to be narrowly limited.

We claim:

1. A rod-bed assembly which forms part of a coater or sizer used to coat or size a fiber web, the rod-bed assembly for holding a rod which engages a fiber web to coat or size the fiber web, comprising:
   a linearly extending holder of a type used in a coater or sizer to hold a rod used to engage a fiber web, portions of the holder forming a first side and a linearly extending groove opening on to the first side, the linearly extending groove defining a first direction along which the groove extends;
   a linearly extending insert formed of a selected material, the insert having a recess which defines an inner surface and an outer surface opposite the recess;
   wherein the insert is removably and insertably supported on the insert's outer surface in the groove of the holder;
   wherein the insert has a cross-section perpendicular to the first direction, and has a thickness measured at the cross-section of the insert, wherein the thickness of the insert is defined between the inner surface and the outer surface along a normal to the inner surface or the outer surface, which thickness is between 1-5 mm; and
   wherein the rod-bed assembly is arranged to support a rod for rotation in the recess of the insert, and on the front side of the holder.

2. The rod-bed assembly of claim 1 wherein the insert is of an elastic material or is of a shape which provides elasticity to the insert.

3. The rod-bed assembly of claim 1 wherein the cross sectional material thickness of the insert is substantially even except for at least one drawdown portion of decreased material thickness for providing elasticity to the insert for inserting the insert into the groove.

4. The rod-bed assembly of claim 1 wherein the portions of the holder forming the groove form a circular part of the groove, and water exit channels extend outwardly from the circular part of the groove and into the linearly extending holder, the water exit channels providing a passage for water to exit, the water exit channels having tips most distal from the circular part of the groove and wherein the cross-sectional material thickness of the insert is substantially uniform except that the material thickness of the insert decreases in thickness where the insert overlies the tips of the water exit channels in the holder.

5. The rod-bed assembly of claim 1 wherein the insert is mounted insertably and removably from the front side of the holder.

6. The rod-bed assembly of claim 1 wherein the insert is formfitting within the groove of the holder.

7. The rod-bed assembly of claim 1 wherein the recess of the insert has a round main inner form for locking a rod into the rod-bed assembly when the rod is placed into the insert.

8. The rod-bed assembly of claim 1 wherein the holder is of a composite material or polyethene and wherein the insert is of a composite material or polyethene.

9. The rod-bed assembly of claim 7, wherein the round main inner form of the recess is over 25 mm in diameter.

10. The rod-bed assembly of claim 4 wherein the water exit channels of the rod-bed assembly include a water exit channel that is lower when the rod-bed assembly is positioned for use of a first diameter and a water exit channel that is upper when the rod-bed assembly is positioned for use of a second diameter, wherein the diameter of the water exit channel that is lower is at least the same as the diameter of the water exit channel that is upper.

11. A rod and rod-bed assembly for a device for coating or sizing a fiber web comprising:
   a linearly extending holder, portions of the holder forming a first side and a linearly extending groove opening on to the first side, the linearly extending groove defining a first direction along which the groove extends;
   a linearly extending insert formed of a selected material, the insert having a front side and portions forming a recess in the front side, the recess defining an inner surface and the insert having an outer surface opposite the recess;
   wherein the insert is removably and insertably supported on the insert's outer surface in the groove of the holder;
   a rod of a selected diameter, the rod rotatably supported in the recess on the front side of the insert;
   wherein the insert has a cross-section plane perpendicular to the first direction, and has a thickness in the cross-section plane of the insert, wherein the thickness of the insert is defined between the inner surface and the outer surface along a line perpendicular to a tangent in the cross-section plane at a point on the inner surface or the outer surface, which thickness is between 1-5 mm.

12. The rod and rod-bed assembly of claim 11 wherein the insert is of an elastic material.

13. The rod and rod-bed assembly of claim 11 wherein the insert has a shape which imparts sufficient elasticity so that the insert can be bent to be removably and insertably supported on the insert's outer surface in the groove of the holder.

14. The rod and rod-bed assembly of claim 11 wherein the rod is cylindrical and defines a radial direction, and wherein the rod is supported on the inner surface of the recess in the front side of the insert, and is removable in the radial direction and insertable in the radial direction.

15. The rod and rod-bed assembly of claim 11 wherein the selected diameter of the rod is over 25 mm.

* * * * *